ized

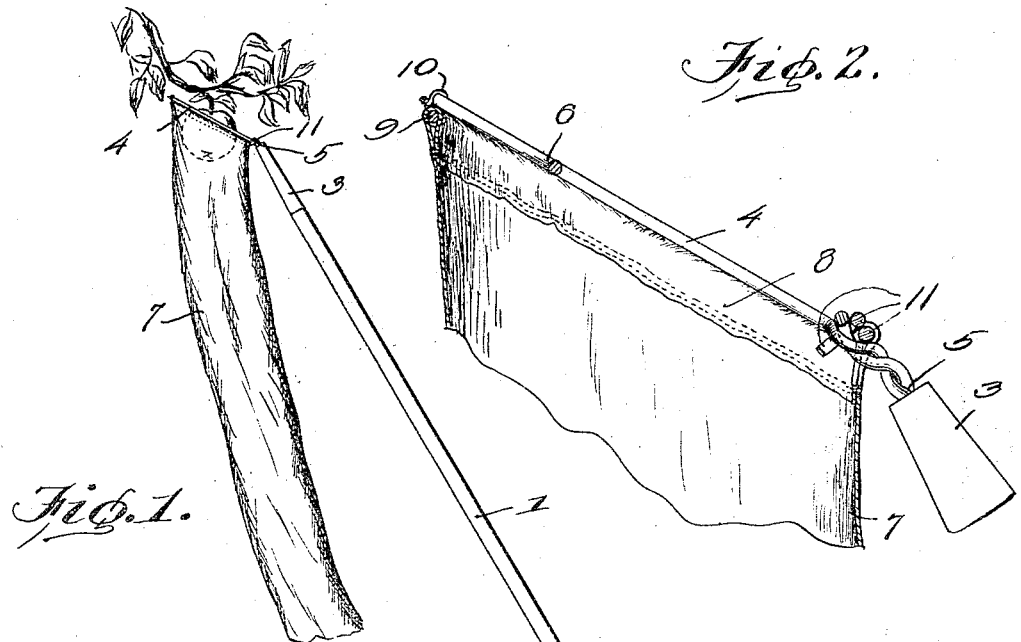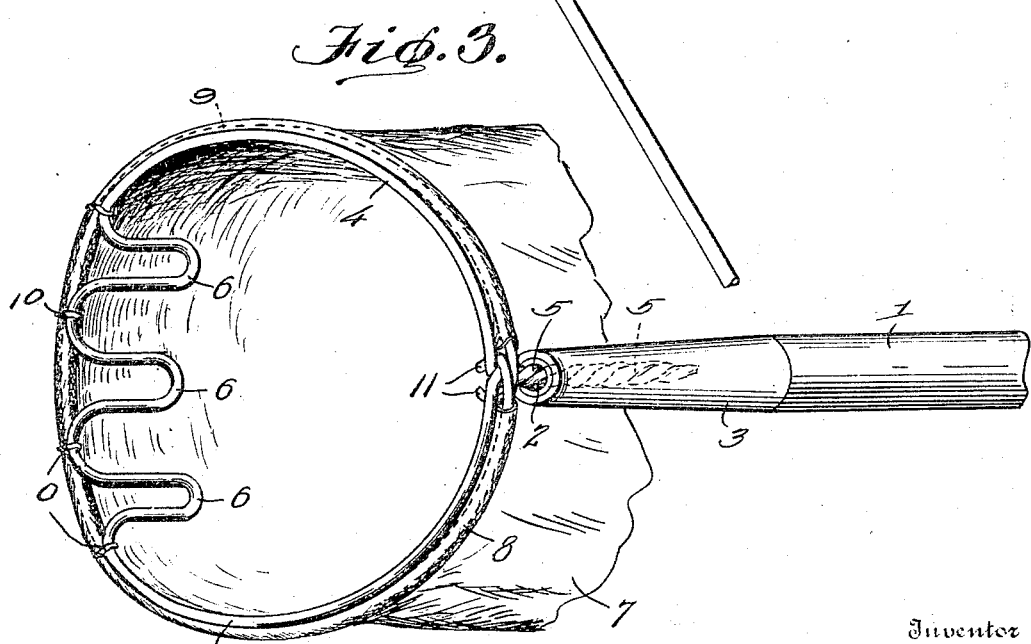

UNITED STATES PATENT OFFICE.

JOSEPH PAUL, OF NASHUA, NEW HAMPSHIRE.

FRUIT-GATHERER.

1,235,371.  Specification of Letters Patent.  Patented July 31, 1917.

Application filed September 18, 1916. Serial No. 120,760.

*To all whom it may concern:*

Be it known that I, JOSEPH PAUL, a citizen of the United States, residing at Nashua, in the county of Hillsborough and State of New Hampshire, have invented new and useful Improvements in Fruit-Gatherers, of which the following is a specification.

My present invention pertains to fruit gathering devices, and consists in the simple and inexpensive, easily manufactured and efficient device constructed as hereinafter described and definitely claimed.

The invention in all of its details will be fully understood from the following description and claim when the same are read in connection with the drawings, accompanying and forming part of this specification, in which:

Figure 1 is a perspective illustrative of the manner of using my novel fruit gatherer.

Fig. 2 is an enlarged diametrical section through the open main frame, and the wire frame below the main frame, and showing the manner of connecting the latter frame with the former.

Fig. 3 is an enlarged perspective plan also illustrative of said frames, the tube and the handle.

Similar numerals of reference designate corresponding parts in all of the views of the drawings.

In addition to the usual handle 1, which is provided at its upper end with a socket 2 and a metallic ferrule, 3, my novel construction of fruit gatherer comprises an open frame 4, of wire or the like, provided with a shank 5 that is disposed and held in the socket 2 of the handle. The said open frame 4 is disposed at an obtuse angle to the handle 1, and is provided on its side remote from the handle end with a plurality of loops 6, formed by convolutions of the wire, and arranged within the outline of the open frame. Some of the said loops, as will be observed, have their bights toward the end of the handle, while the other loops have their bights at or adjacent to the outline of the open frame, for an important purpose hereinafter set forth.

Arranged below and corresponding in transverse size to the open frame 4 is the mouth of a flexible tube 7, preferably of textile material. The said tube 7 is designed to be of sufficient length to reach from the point where a piece of fruit is plucked from a tree to a point adjacent to the ground where the tube is grasped by an attendant with a view of retarding the gravitation of the fruit and thereby preventing injury to the same when it drops into a basket or other receptacle placed to receive it. At its mouth end the tube 7 is provided with a loop or hem 8, and in said loop or hem is arranged a wire frame 9 which serves to hold the said mouth in an open state ready for the free passage of fruit into the tube. The said wire frame 9 is connected at intermediate points in its length and preferably through small wire fasteners 10 with the loop bights adjacent to the outline of the open frame 4; and it serves to hold the mouth of the tube 7 close against the underside of the frame 4, and at the same time contributes materially to the inexpensive and strong connection of the tube to the frame 4 in such manner that the tube may be readily disconnected from the frame 4 when necessary or desirable. At its ends the wire frame 9 is provided with oppositely-disposed hooks 11. These hooks 11, as will be readily observed, are arranged in lapped relation on and straddle the shank 5 of the open frame 4, and thereby effect a strong connection of the ends of the wire frame 9 to the said shank 5 without the employment of extraneous means, and it will also be observed that when it is desired to disconnect the tube-carrying wire frame 9 from the open frame 4, the said hooks 11 can be expeditiously and easily disengaged from the shank 5.

In the practical use of my novel gatherer, the operator manipulates the handle 1 so that a piece of fruit on a tree is disposed in the upper portion of the tube 7, and then gives the gatherer a sharp pull, whereupon the stem of the piece of fruit will be received in one of the outwardly directed loops of the open frame 4 and will be broken by the bight of said loop, with the result that the piece of fruit will without injury thereto gravitate through the soft tube 7 to the receptacle placed to receive it or to the hand of an attendant who may receive the pieces of fruit from the tube 7 and then place the same by hand in a basket or other receptacle. It will be noticed in this connection that incidental to the gathering of a piece of fruit there is no necessity of the fruit contacting with the metallic portions of the gatherer, and hence no liability of the fruit being bruised or otherwise marred.

Having described my invention, what I claim and desire to secure by Letters Patent, is:

The herein described fruit gathering device, consisting of a handle, an open wire frame disposed at an obtuse angle to the upper end of the handle and connected therewith and including a plurality of loops at its side remote from the handle end, said loops being in the plane of the frame, a flexible tube of soft material having a hem at its mouth, with said mouth disposed below said open wire frame, a detachable wire frame extending through said hem and having oppositely disposed hooks at its ends engaging the shank of the first-named frame, and fastenings connecting said frame and the loops of the first-named frame.

In testimony whereof I have hereunto set my hand in presence of two subscribing witnesses.

JOSEPH PAUL.

Witnesses:
MABEL A. THOMPSON,
ELIZABETH C. WARREN.

Copies of this patent may be obtained for five cents each, by addressing the "Commissioner of Patents, Washington, D. C."